L. M. DAVIS.
ELECTRIC TROLLEY.
APPLICATION FILED MAR. 23, 1911.
1,022,357.
Patented Apr. 2, 1912.
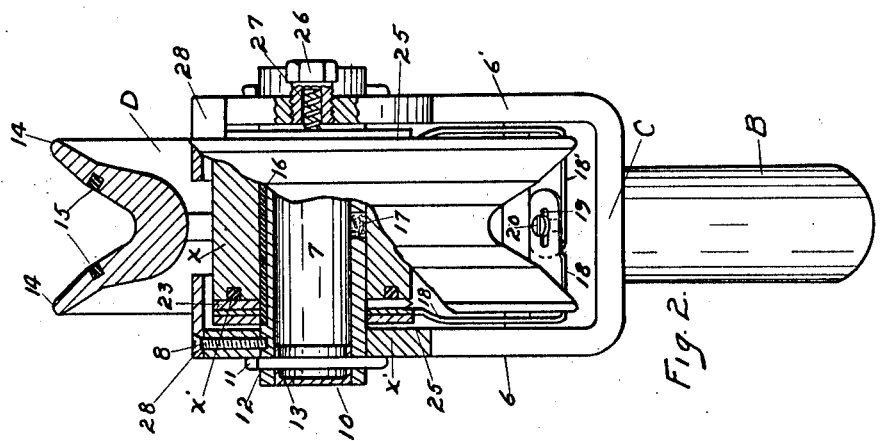
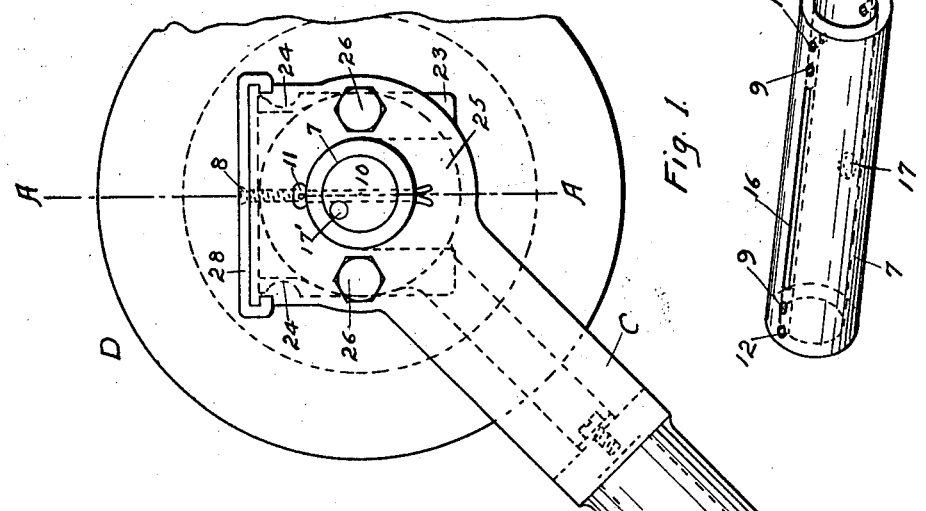
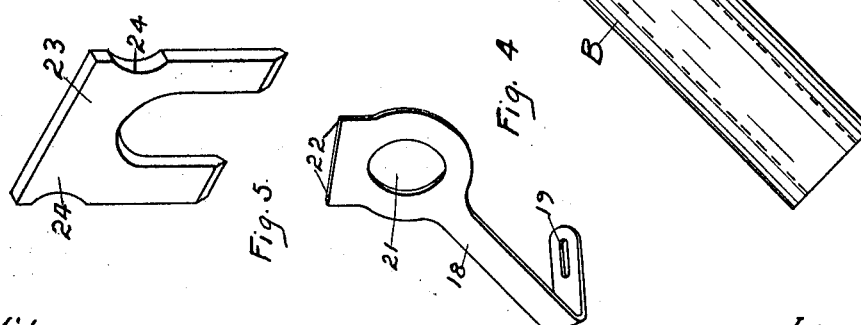
Witnesses
F. A. Bullington
P. H. Baughman
Inventor.
Luther M. Davis.
By R. C. Wright.
Attorney.

UNITED STATES PATENT OFFICE.

LUTHER M. DAVIS, OF PORTLAND, OREGON.

ELECTRIC TROLLEY.

1,022,357. Specification of Letters Patent. Patented Apr. 2, 1912.

Application filed March 23, 1911. Serial No. 616,429.

*To all whom it may concern:*

Be it known that I, LUTHER M. DAVIS, a citizen of the United States, residing at Portland, in the county of Multnomah and State of Oregon, have invented a new and useful Improvement in Electric Trolleys, of which the following is a specification, reference being had to the accompanying drawings.

My invention relates to a class of devices appertaining to apparatus intended to provide means for electric contact and transmission of electric energy, more particularly for cars and vehicles.

The object of my invention is to provide a device wherein the great wear upon the trolley wheel in its bearings may be eliminated or reduced to a minimum, and at the same time the means of conducting the electric current shall be the best. Also to provide automatic lubricating means for the trolley wheel in its bearings and when engaging the wire. I attain these objects as well as other advantages, by the construction, combination and arrangement of parts illustrated in the accompanying drawings which form a part hereof.

Figure 1 is a side elevation of a trolley pole and my device thereon. Fig. 2 is a rear view, partly in section, of the device shown in Fig. 1, on the line A—A thereof. Fig. 3 is an enlarged perspective view of the tubular shaft which carries the trolley wheel. Fig. 4 is an enlarged perspective view of a current conductor embraced in my device. Fig. 5 is an enlarged perspective view of a contact piece employed in the device.

Like numerals and letters refer to like parts throughout the views.

B is a trolley pole and C a trolley harp rigidly secured upon the end of the pole. The prongs of the harp are numbered 6—6'.

A transverse tubular shaft 7 is mounted within the harp in bearings in the prongs 6—6'. The shaft 7 is rigidly secured in place by locking screws 8 at either end, which enter openings 9 in the shaft. They also serve to keep the shaft in alinement within the harp. Tubular plugs 10 are also provided, of form and dimension adapted to telescope into either end of the shaft. They are rigidly retained in position within the shaft by cotter pins 11 which pass through openings 12 in the shaft and 13 in the plugs. A trolley wheel D, having a hub X and lubricator pockets X' in the ends thereof, is rotatably mounted on the shaft 7. The wheel has spreading flanges 14 and within them at suitable distances are formed recesses 15 for the reception of graphite or other dry lubricant. The shaft 7 has a longitudinal recess 16 in its upper side to receive graphite or other dry lubricant, also an opening 17 in its lower side for the discharge of lubricant from within the shaft. The lubricant discharge opening 17 is formed in the center of the shaft 7 and is disposed so as to be opposite the vertical center of the wheel D. Either of the plugs 10 may be removed and the shaft chamber filled with oiled waste. There is also an opening 17' in the plugs to allow oil to be introduced into the shaft.

A conductor comprising two members 18—18' is provided. These are formed at right angles on their lower ends with longitudinal slots 19 therein. The lower ends are adjustably secured to the lower part of the trolley harp by a screw 20. The conductors extend upward to the ends of the shaft 7 and have openings 21 in them through which the shaft passes. The upper ends 22 of the conductor form extending ears to allow of easy insertion of the contact pieces 23. Contact pieces 23 are also provided, having finger grips 24 near their upper ends to permit of their easy removal. The lower ends are beveled, the central portion being arched to adapt them to be received over the shaft 7 between the hub X and the members 18—18' of the conductor. Between the members 18—18' and the respective harp prongs 6—6' washers 25 are placed. The prongs 6—6' have recessed screws 26 which extend through openings therein as far as the washer. Within the screws 26 are coil springs 27, one end engaging the inner end of the screw, the opposite end engaging the washers 25. Caps 28 are placed on top of the harp prongs 6—6' serving to protect the mechanism below them, also to engage the upper end of the conductors to prevent their rotating with the wheel D.

It will now be seen that when the parts are assembled as illustrated in Figs. 1 and 2, the screws 26 secure the trolley prongs against the washers 25 and in turn the conductors 18—18' are thereby pressed against the contact pieces 23, and these against the trolley hub X, by means of the springs 27, thus continuously holding the trolley wheel in even engagement with the contact pieces as they wear away by the friction. When so worn they may be quickly removed and new pieces inserted, by taking off the caps 28 and so replacing. This may be done without disturbing other parts of the mechanism. The lower ends of the conductor permit of its adjustment, and also of the flexible movement of its upper ends with relation to the hub X. The graphite or lubricator pockets X' lubricate between the hub X and contact pieces 23. The graphite holder 16 of the shaft 7 aids to lubricate the wheel. The lubricant within the shaft also lubricates the wheel, passing through the opening 17. It is intended by placing the opening 17 in the center of the shaft as shown, that it will be opposite the vertical center of the wheel D and thus permit the lubricant to flow evenly within the bearing and with the least possible waste thereof. It will also be seen that the form of the trolley wheel groove is such that the wire will not slip out of it so easily, and when it rises on curves the graphite pockets 15 lubricate the wheel and allow its freer movement along the wire. It will be further seen that the form of the conductor is such that its members allow of free movement and a certain passage of the electric current from the wire through trolley wheel, contact piece, conductor, and trolley harp and thence through the pole to ground. This circuit is thus always maintained in the best working order by my device. The use of graphite in the lubricating pockets of the hub and in the wheel groove also permits free passage of the electric current as well as serving to lubricate.

Having thus described my invention, I claim:

1. An electric trolley having a harp with parallel prongs and a trolley wheel mounted on a rigid shaft therein, a conductor having two members movable toward each other within the harp, provided with slots in their lower ends and secured by a screw to the lower part of the trolley harp, the upper ends extending upward with openings therein through which the shaft extends, contact pieces arched to fit over the shaft, placed between the wheel hub and the conductor members, and washers upon the shaft between the conductor members and the harp prongs, substantially as described.

2. An electric trolley having a harp with parallel prongs and a trolley wheel mounted on a rigid shaft therein a conductor having two members movable toward each other within the harp, provided with slots in their lower ends and secured by a screw to the lower part of the trolley harp, the upper ends extending upward with openings therein through which the shaft extends, and contact pieces arched to fit over the shaft and placed between the wheel hub and the conductor members, substantially as described.

3. An electric trolley having a harp with parallel prongs and a trolley wheel mounted on a rigid shaft therein, washers between the wheel hub and the harp prongs, recessed screws extending through the prongs into engagement with the washers, and springs within the screw recesses extending outwardly into engagement with the face of the washers, substantially as described.

4. An electric trolley comprising a harp with parallel prongs, a trolley wheel mounted therein, a rigid tubular wheel shaft supported by the prongs, provided with a lubricant discharge opening in its lower side and means to retain a lubricant within the shaft until slowly discharged, a conductor having two members movable toward each other within the harp, provided with slots in their lower ends and secured by a screw to the lower part of the trolley harp, the upper ends extending upward with openings therein through which the shaft extends, contact pieces arched to fit over the shaft, placed between the wheel hub and the conductor members, washers upon the shaft between the conductor members and the harp prongs, recessed screws extending through the prongs into engagement with the washers and springs within the screw recesses extending outwardly into engagement with the face of the washers, substantially as described.

LUTHER M. DAVIS.

Witnesses:
FRANK BOLLAM,
CLAY S. MORSE.